US012779793B2

(12) United States Patent
Nishimura et al.

(10) Patent No.: US 12,779,793 B2
(45) Date of Patent: Nov. 3, 2026

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventors: Isao Nishimura, Ishikawa-ken (JP); Yasuyuki Ishida, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 420 days.

(21) Appl. No.: 18/085,073

(22) Filed: Dec. 20, 2022

(65) Prior Publication Data

US 2023/0219306 A1 Jul. 13, 2023

(30) Foreign Application Priority Data

Jan. 13, 2022 (JP) ................................ 2022-003781

(51) Int. Cl.
*B29C 70/38* (2006.01)
*B29C 35/08* (2006.01)
*B29K 105/08* (2006.01)

(52) U.S. Cl.
CPC ........ *B29C 70/384* (2013.01); *B29C 35/0805* (2013.01); *B29C 2035/0838* (2013.01); *B29K 2105/0872* (2013.01)

(58) Field of Classification Search
None
See application file for complete search history.

(56) References Cited

U.S. PATENT DOCUMENTS 10,016,947 B2 7/2018 Matsen et al.
2006/0276861 A1* 12/2006 Lin ........................ A61B 18/20 606/2
2014/0060742 A1 3/2014 Hamlyn
2016/0325508 A1 11/2016 Hamlyn
2017/0151731 A1* 6/2017 Ho Yew Chi .......... B33Y 50/00
2017/0259502 A1* 9/2017 Chapiro ................. B33Y 70/10
2019/0351647 A1* 11/2019 Calder ..................... C08J 5/042
2019/0389148 A1 12/2019 Wadsworth
(Continued)

FOREIGN PATENT DOCUMENTS

DE 10329431 A1 2/2005
FR 3022177 A1 12/2015
JP 2014-511781 A 5/2014

OTHER PUBLICATIONS

Jun. 14, 2023, European Search Report issued for related EP Application No. 22215626.7.
(Continued)

*Primary Examiner* — Xiao S Zhao
(74) *Attorney, Agent, or Firm* — Paratus Law Group, PLLC

(57) ABSTRACT

An automated fiber bundle placement apparatus is configured to lay a strip-like fiber bundle impregnated with a thermoplastic resin on a stacking surface on an upper side of a placement die by moving a placement head and by emitting a laser from an emitting device to deposit the fiber bundle on the stacking surface incompletely. The emitting device is configured to emit the laser toward the fiber bundle laid on the stacking surface to its surface that is a reverse side of its surface facing the stacking surface.

2 Claims, 5 Drawing Sheets

(56) References Cited

U.S. PATENT DOCUMENTS

| | | | | |
|---|---|---|---|---|
| 2020/0024414 | A1* | 1/2020 | Ichino | B29C 70/22 |
| 2020/0086549 | A1* | 3/2020 | Takahashi | B41M 7/0081 |
| 2022/0203635 | A1* | 6/2022 | Iwade | B29C 70/78 |
| 2023/0030198 | A1* | 2/2023 | Parrott | B33Y 10/00 |
| 2024/0092040 | A1* | 3/2024 | Babeau | B29C 70/386 |

OTHER PUBLICATIONS

May 13, 2025, Japanese Office Action issued for related JP Application No. 2022-003781.

* cited by examiner

AUTOMATED FIBER BUNDLE PLACEMENT APPARATUS

CROSS-REFERENCE TO RELATED APPLICATION

This application is based on and claims priority under 35 USC § 119 from Japanese Patent Application No. 2022-003781, filed on Jan. 13, 2022, the entire contents of which are incorporated herein by reference.

TECHNICAL FIELD

The present invention relates to an automated fiber bundle placement apparatus configured to lay a strip-like fiber bundle impregnated with a thermoplastic resin on a stacking surface on an upper side of a placement die by moving a placement head and by emitting a laser from an emitting device to deposit the fiber bundle on the stacking surface incompletely.

BACKGROUND

As an automated fiber bundle placement apparatus, an automated tape layup (ATL) apparatus that places a relatively wide fiber bundle on a placement die, and an automated fiber placement (AFP) apparatus that places a relatively narrow fiber bundle on a placement die are known. Meanwhile, in the present invention, the “fiber bundle” refers to a material, such as a tow prepreg and a prepreg, formed in a tape shape by impregnating a bundle of a plurality of reinforcing fibers (carbon fiber, glass fiber, etc.) with a matrix resin. Further, as the matrix resin, a thermosetting resin that cures when heated and a thermoplastic resin that softens when heated are known.

Among these matrix resins, a thermoplastic resin is non-adhesive by nature at normal temperature (room temperature). Therefore, when a fiber bundle having a thermoplastic resin as a matrix resin is placed on a placement die, a depositing device to deposit the fiber bundle to a stacking surface on the upper side of the placement die is required. Some automated fiber bundle placement apparatuses include a laser emitting device as such a depositing device.

An example of an automated fiber bundle placement apparatus equipped with such a laser emitting device is disclosed in U.S. Pat. No. 10,016,947 B. The automated fiber bundle placement apparatus disclosed in U.S. Pat. No. 10,016,947 B is configured to lay a strip-like fiber bundle impregnated with a thermoplastic resin on a stacking surface of a placement die by moving a placement head and by emitting a laser from a laser emitting device to the fiber bundle to place the fiber bundle to the placement die. However, in this automated fiber bundle placement apparatus, the laser is emitted from the laser emitting device to the surface of the fiber bundle facing the stacking surface.

By the way, when a laser emitting device emits a laser to heat an object, proper heating cannot be performed when a focus of the laser is offset from a surface of the object. Therefore, the laser emitting device (its emission part, from which a laser is emitted) needs to be provided at a position at an appropriate distance in focus from the object. Further, since lasers have high directivity, the laser emitting device has to be provided so that its entire emission part faces the object over the entire irradiation range of the object at the appropriate distance as described above.

Moreover, in the case where such a laser irradiation device is applied to the automated fiber bundle placement apparatus described above, in recent automated fiber bundle placement apparatuses, it is required to increase the moving speed of the placement head in the automated fiber bundle placement apparatus in order to improve the working efficiency when placing a fiber bundle on a stacking surface. In such a case, when the irradiation range by the laser emitting device is narrow, it is necessary to increase the output of the laser emitted from the laser emitting device in order to heat the fiber bundle to a desired temperature by the laser emitted to the irradiation range to deposit the fiber bundle to the stacking surface. However, when the output of laser is increased, scorching may occur on the surface of the fiber bundle irradiated with the laser.

Therefore, in order to reliably deposit the fiber bundle with an output that does not cause scorching while meeting the demand for increasing the moving speed of the placement head as described above, it is necessary to enlarge the irradiation range in a longitudinal direction of the fiber bundle by the laser emitting device. In this case, the laser emitting device has to be sized such that its irradiation portion faces such an enlarged irradiation range as described above, and along with this, the laser emitting device itself becomes large.

However, when the laser emitting device is provided in such a manner that a laser is emitted toward the fiber bundle to its surface facing the stacking surface, as in the automated fiber bundle placement apparatus disclosed in U.S. Pat. No. 10,016,947 B, the laser emitting device is provided at a position separated from the stacking surface to some extent in a direction along the path of the fiber bundle because it is not preferable to provide such a large-sized laser emitting device as described above at a position close to the stacking surface, and the laser emitting device needs to be provided so that its emission part faces the fiber bundle as described above. Therefore, the time from when part of the fiber bundle is heated by the laser to when the part reaches the stacking surface becomes longer, and the fiber bundle may not be properly deposited to the stacking surface.

In view of conventional automated fiber bundle placement apparatus as described above, an object of the present invention is to make an automated fiber bundle placement apparatus configured as described above capable of depositing the fiber bundle to the stacking surface more reliably while meeting the above-described demand for increasing the moving speed of the placement head.

SUMMARY

The present invention presupposes an automated fiber bundle placement apparatus configured to perform placement of a strip-shape fiber bundle impregnated with a thermoplastic resin, the apparatus including a placement head configured to move for performing the placement, an emitting device provided in the placement head, and a main control device, including a placement control device configured to control movement of the placement head such that movement of the placement head for the placement is performed based on a preset moving speed, and an irradiation control device configured to control irradiation of the emitting device such that the emitting device emits a laser from a start time to an end time of one placement. The one placement includes laying the fiber bundle on a stacking surface on an upper side of a placement die by moving a placement head and temporarily welding the laid fiber bundles to the stacking surface by emitting a laser from an emitting device to deposit the fiber bundle.

The present invention is characterized in that the emitting device is configured to emit the laser toward the fiber bundle laid on the stacking surface to its surface that is a reverse side of its surface facing the stacking surface. A moving speed of the placement head and/or an irradiation range of the laser in a direction in which the placement head moves is determined such that irradiation duration, for which the laser is continuously irradiated to the same location in a longitudinal direction of the fiber bundle and which is obtained by dividing the irradiation range of the emitting device itself by the moving speed, is within the range of 0.1-0.4 sec.

BRIEF DESCRIPTION OF DRAWINGS

Exemplary embodiments of the present disclosure will be described in detail based on the following figures, wherein.

DESCRIPTION OF EMBODIMENTS

Hereinafter, an embodiment (the present embodiment) of an automated fiber bundle placement apparatus according to the present invention will be described with reference to FIGS. 1 to 3.

Figure 1:
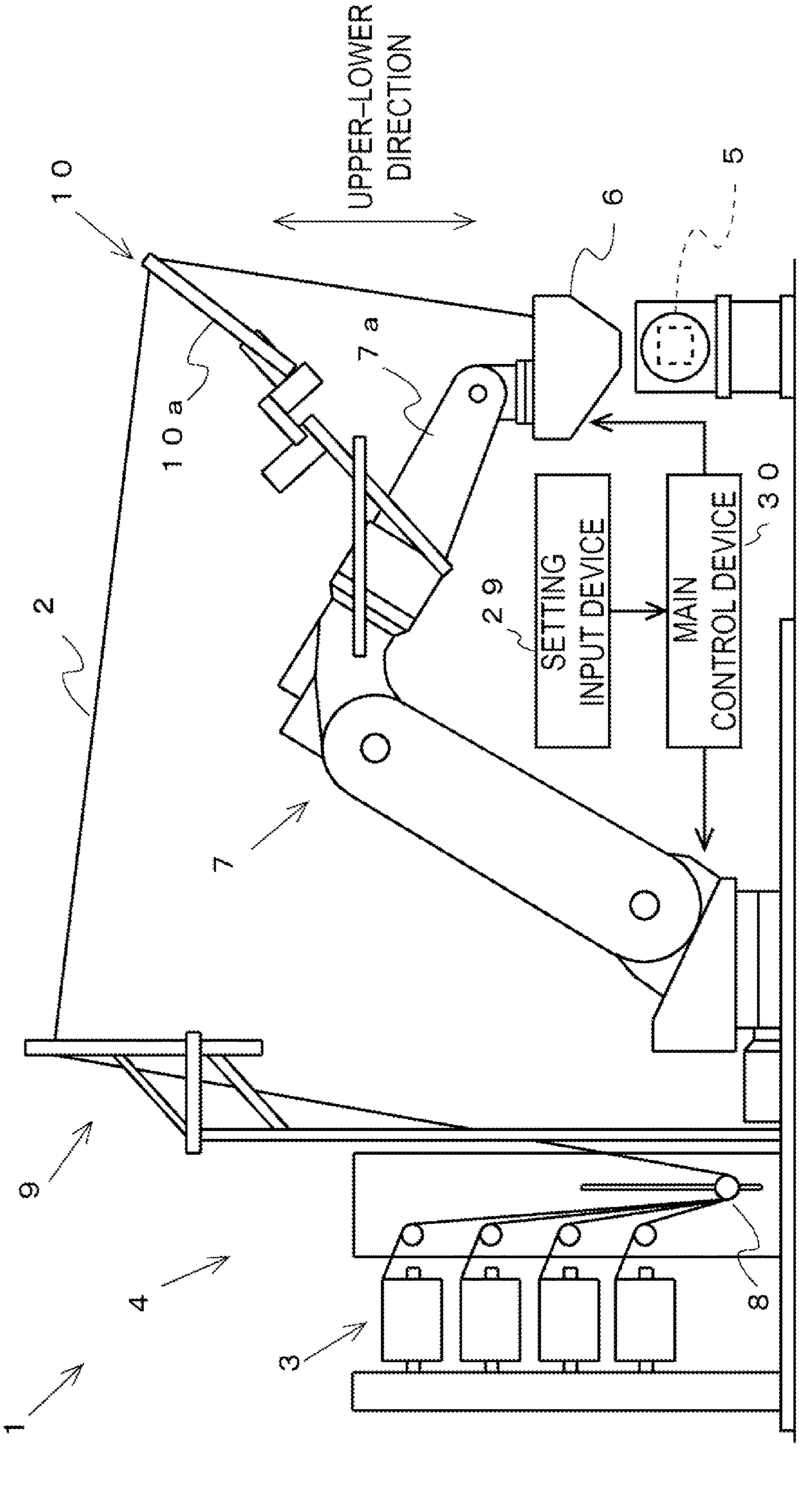
FIG. 1 is a side view of an automated fiber bundle placement apparatus to which the present invention is applied.

As shown in FIG. 1, an automated fiber bundle placement apparatus 1 is configured to lay a fiber bundle 2 on a stacking surface 5*a* on the upper side of a placement die 5 by the moving a placement head 6. The fiber bundle 2 is impregnated with a thermoplastic resin that is softened when heated as a matrix resin. The automated fiber bundle placement apparatus 1 includes a supplying device 4 in which the fiber bundle 2 is wound around a bobbin 3, the placement head 6 configured to lay the fiber bundle 2 supplied from the supply device 4 on the placement die 5, and a polyarticular robot 7 configured to move the placement head 6.

In the present embodiment, the automated fiber bundle placement apparatus 1 is configured to lay eight fiber bundles 2 simultaneously. Therefore, the eight fiber bundles 2 are wound around eight bobbins 3 (only four of them that are on the front side are shown) in the supplying device 4. The supplying device 4 includes a guide unit 9 configured to guide the fiber bundle 2 pulled out from each of the bobbins 3 toward the polyarticular robot 7 from a position higher than the polyarticular robot 7. The fiber bundle 2 pulled out from each of the bobbins 3 is guided by the guide unit 9 via a dancer roller 8 provided between the bobbins 3 and the guide unit 9 and then is led to the polyarticular robot 7.

A guide mechanism 10 configured to guide each of the fiber bundles 2 guided by the guide unit 9 as described above is attached to an arm 7*a* on the tip side of the polyarticular robot 7. The placement head 6 is attached to the tip of the arm 7*a*. Each of the fiber bundles 2 guided by the guide unit 9 as described above is guided by the guide mechanism 10 and is introduced into the placement head 6.

Figure 2:
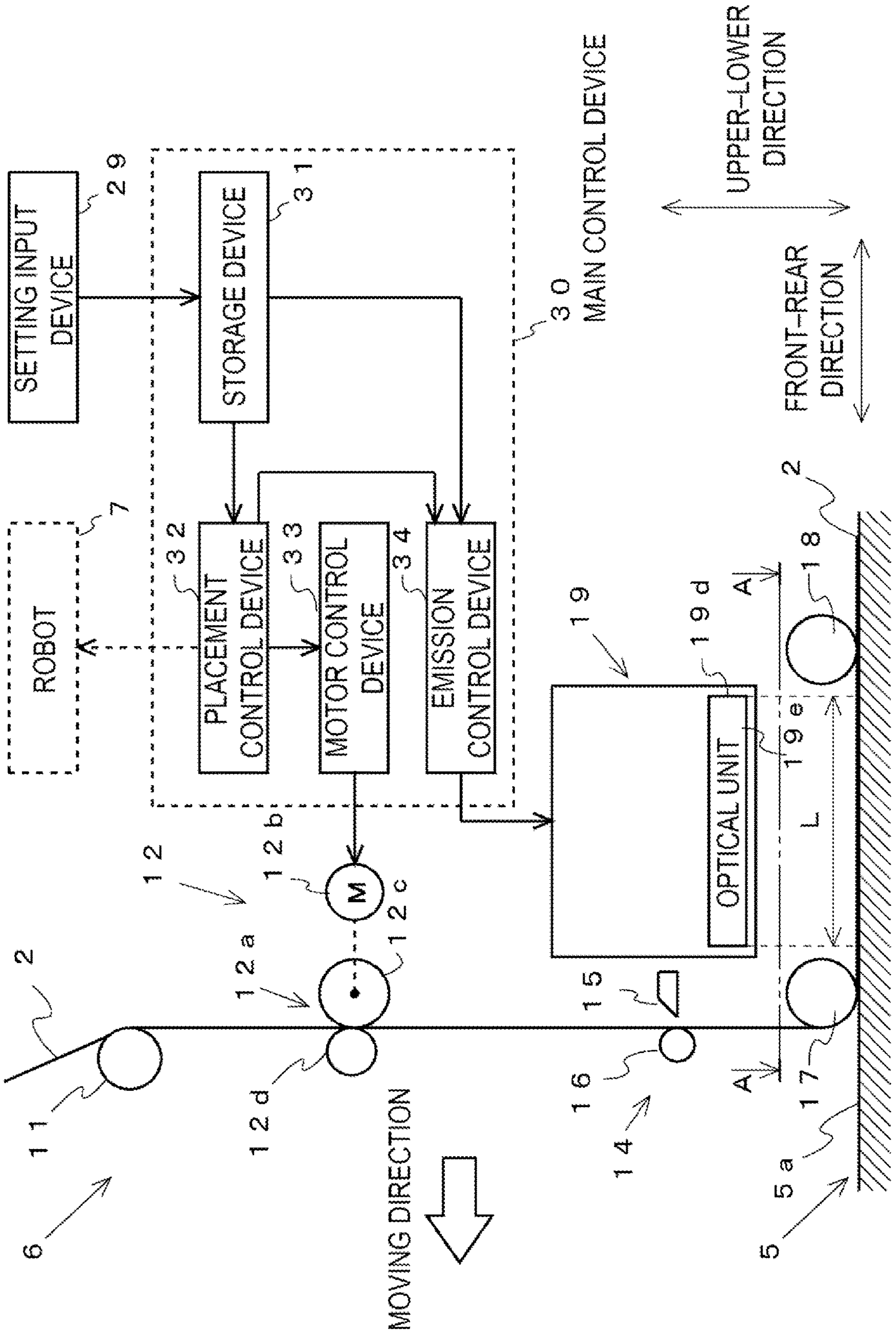
FIG. 2 is an explanatory view showing a placement head of the automated fiber bundle placement apparatus.

FIG. 2 is a view schematically showing an internal configuration of the placement head 6 and accompaniments thereto. As shown in FIG. 2, inside the placement head 6 are introduction rollers 11, which are provided on the upper side of the placement head 6 and are configured to guide the fiber bundle 2 introduced into the placement head 6 as described above, and feeding mechanisms 12, which are provided downstream from the introduction rollers 11 in the path of the fiber bundle 2 and are configured to feed the fiber bundle 2 toward the stacking surface 5*a* on the upper side of the placement die 5. The placement head 6 includes a pressing roller 18 configured to press the fiber bundle 2 pulled out from the feeding mechanism 12 against the stacking surface 5*a*, and a guide roller 17, which is provided upstream (the feeding mechanism 12 side) from the pressing roller 18 in the path and is configured to turn the fiber bundle 2 toward the pressing roller 18. A cutting device 14 configured to cut the fiber bundle 2 is provided between the feeding mechanisms 12 and the guide roller 17 on the path.

Each of the introduction roller 11 (only one of them that is on the front side is shown) is provided for the corresponding one of the fiber bundles 2 introduced into the placement head 6. Each of the feeding mechanisms 12 is also provided for the corresponding one of the fiber bundles 2 on the path and includes a transfer mechanism 12*a* and a drive motor 12*b* configured to drive the transfer mechanism 12*a* rotationally. Each of the transfer mechanisms 12*a* includes a pair of rollers 12*c*, 12*d* configured to nip the fiber bundle 2. In each of the transfer mechanisms 12*a*, one (the roller 12*c* in the illustrated example) of the pair of rollers 12*c*, 12*d* is actively driven by the drive motor 12*b*, and the other is passively driven. As a result, the fiber bundle 2 is fed out toward the stacking surface 5*a* on the upper side of the placement die 5.

The guide roller 17 is a roller-like member configured to guide the fiber bundle 2 transferred by the feeding mechanism 12 as described above and is rotatable with respect to a frame of the placement head 6. The guide roller 17 is a single member provided for all of the fiber bundles 2. It is provided downstream from the feeding mechanisms 12, and its axial direction is orthogonal to a direction in which the placement head 6 moves. It is provided at a position where its peripheral surface can be pressed against the stacking surface 5*a* when laying the fiber bundles 2. The fiber bundles 2 are guided by being wound around the peripheral surface of the guide roller 17, so that the path is turned to a direction parallel to the stacking surface 5*a*.

The pressing roller 18 is a roller-like member configured to press the fiber bundle 2 turned by the guide roller 17 as described above against the stacking surface 5*a* and is a so-called compaction roller. Similar to the guide roller 17, the pressing roller 18 is a single member provided for all the fiber bundles 2. The pressing roller 18 is supported on the frame of the placement head 6 by a pressing mechanism (not shown) configured to generates a pressing force toward the placement die 5 and is rotatable with respect to the pressing mechanism (the frame). The pressing roller 18 has an axial direction aligned with an axial direction of the guide roller 17 and is provided on the side opposite to the moving direction of the placement head 6 with a gap from the guide roller 17. The pressing roller 18 is also provided at a position where its peripheral surface can be pressed against the stacking surface 5*a* when laying the fiber bundles 2 and is pressed against the stacking surface 5*a* through the fiber bundle 2 when laying the fiber bundles 2.

Since the placement head 6 is configured to include the components as described above, each of the fiber bundles 2 in introduced to the one of the corresponding introduction rollers 11 and one of the corresponding transfer mechanisms

12*a* inside the placement head 6 and is turned by the guide roller 17 toward the pressing roller 18. The fiber bundle 2 is along the stacking surface 5*a* when laid. In the present embodiment, similar to the pressing roller 18, the guide roller 17 is also supported on the frame of the placement head 6 by a pressing mechanism (not shown) configured to generates a pressing force toward the placement die 5. Therefore, the fiber bundle 2 is also pressed against the stacking surface 5*a* by the guide roller 17 when laid.

The cutting device 14 includes a cutting blade 15 provided for each of the fiber bundles 2 on the path, a fixed member 16 configured such that the path is sandwiched between the cutting blade 15 and the fixed member 16, and a driving mechanism (not shown) that is provided for each of the cutting blades 15 and is configured to cause the cutting blade 15 to perform cutting operation for cutting the fiber bundle 2. The cutting device 14 cuts the fiber bundle 2 by the cutting blade 15 caused to perform the cutting operation by the driving mechanism in cooperation with the fixed member 16.

As shown in FIG. 1, the automated fiber bundle placement apparatus 1 further includes a main control device 30, which is accommodated in a control box (not shown) included in the automated fiber bundle placement apparatus 1. In the automated fiber bundle placement apparatus 1, the main control device is configured to control operation of the polyarticular robot 7 configured to perform the laying and operation of each component of the placement head 6 attached to the polyarticular robot 7. Therefore, the main control device 30 is also configured to control operation of the feeding mechanism 12 (the transfer mechanism 12*a*) and operation of the cutting device 14 included in the placement head 6.

The control of operation of each component is executed according to predetermined operation programs. Thus, as shown in FIG. 2, the main control device 30 includes a storage device 31 configured to store the operation programs, a placement control device 32 connected to the storage device 31 to control the polyarticular robot 7, and a motor control device 33 configured to control driving of the drive motor 12*b* in each of the feeding mechanisms 12. Settings of the operation programs are executed using a setting input device 29 connected to the storage device 31.

The operation programs set in the storage device 31 using the setting input device 29 includes a moving speed of the placement head 6 during each laying of the fiber bundle 2. The placement control device 32 is configured to control the operation of each component of the polyarticular robot 7 such that the placement head 6 moves at the set moving speed during each laying of the fiber bundle 2, is configured to output a speed signal depending on the set moving speed to the motor control device 33 in each laying of the fiber bundle 2, and is configured to output a stop signal to the motor control device 33 when the placement head 6 moving at the moving speed reaches an end position in each laying of the fiber bundle 2.

The motor control device 33 is configured to control driving of the feeding mechanism 12 (the drive motor 12*b*) based on the moving speed such that a speed (hereinafter, referred to as a "transfer speed") at which the fiber bundle 2 is fed toward the stacking surface 5*a* corresponds to the moving speed. Therefore, the motor control device 33 is configured to calculate a rotation speed of the roller 12*c* (the drive motor 12*b*) realizing the transfer speed that matches the moving speed, based on the moving speed indicated by the speed signal, to control driving of the drive motor 12*b* in accordance with the calculated rotation speed.

In the automated fiber bundle placement apparatus configured as described above, in the present invention, the automated fiber bundle placement apparatus further includes an emitting device 19 configured to deposit the fiber bundles 2 onto the stacking surface 5*a* incompletely by heating the fiber bundles 2. In the present invention, the emitting device 19 is configured to emit a laser toward the fiber bundles 2 laid on the stacking surface 5*a* to their surface 2 that is reverse side of their surface facing the stacking surface 5*a*. Further, in the present embodiment, the emitting device 19 is configured to emit the laser to part of the fiber bundles 2 between the pressing roller 18 and the guide roller 17 on the path of the fiber bundles 2. An embodiment (the present embodiment) of the automated fiber bundle placement apparatus will be described in detail below with reference to FIGS. 2 and 3.

The emitting device 19 is a laser emitting device configured to emit an infrared laser from a laser diode supplied with electric power to an object to be irradiated. As shown in FIG. 2, the emitting device 19 is positioned inside the placement head 6 between the pressing roller 18 and the guide roller 17 in a direction (hereinafter, referred to as a "front-rear direction") parallel to the direction (moving direction) in which the placement head 6 moves during each laying of the fiber bundle 2 and faces the stacking surface 5*a* during each laying of the fiber bundle 2.

Here, the arrangement of the emitting device 19 in a thickness direction (upper-lower direction) of the fiber bundle 2 across the pressing roller 18 and the guide roller 17 during each laying of the fiber bundle 2 is located above the lowest position in the upper-lower direction of the peripheral surfaces of the pressing roller 18 and the guide roller 17. Therefore, the emitting device 19 is arranged on the side opposite to the stacking surface 5*a* with respect to the fiber bundle 2 across the pressing roller 18 and the guide roller 17 during each laying of the fiber bundle 2. That is, the emitting device 19 is configured to emit the infrared laser toward the fiber bundles 2 to their surface that is reverse side of their surface facing the stacking surface 5*a* during each laying of the fiber bundle 2.

Figure 3:
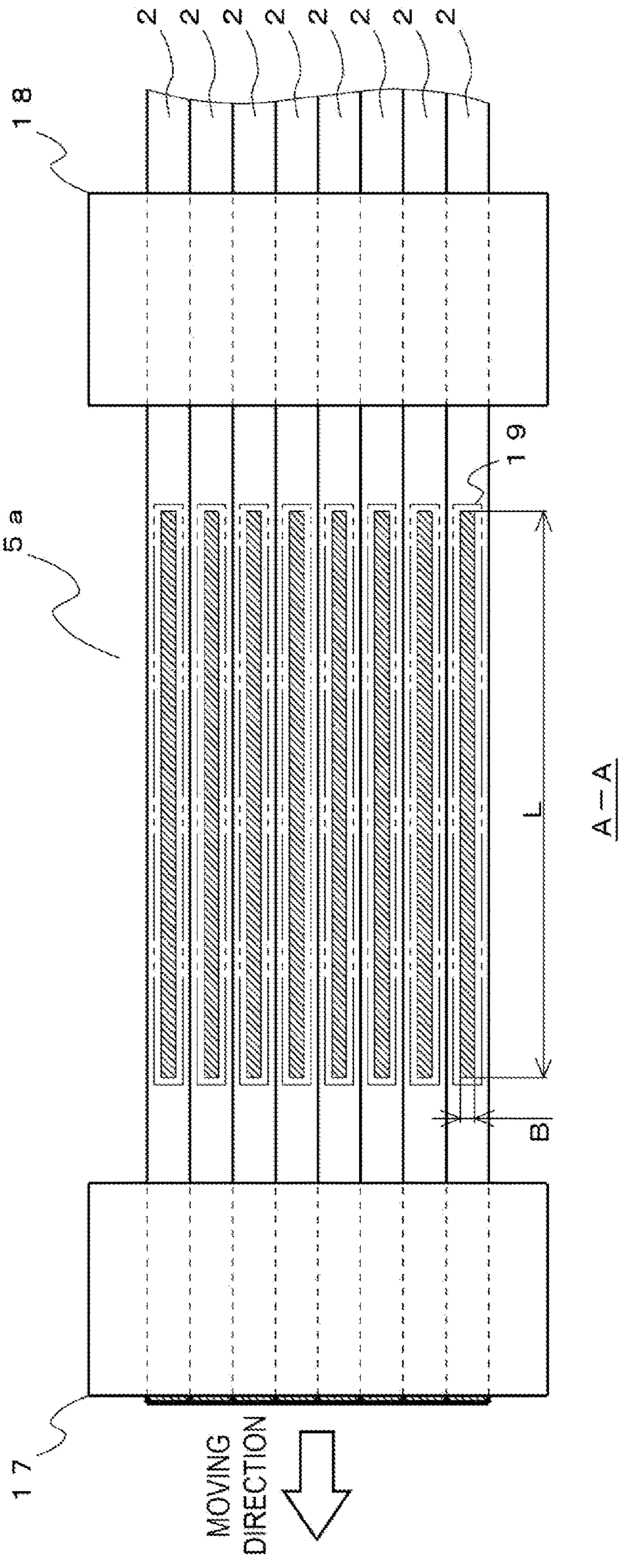
FIG. 3 is a cross sectional view as seen from a direction indicated by arrows A-A shown in FIG. 2.

Further, in the present embodiment, as shown in FIG. 3, the emitting device 19 is provided for each of the fiber bundles 2 abreast in the axial direction (width direction) of the guide roller 17. Furthermore, each of the emitting devices 19 includes an optical unit 19*d* configured to focus the infrared laser on a surface of the object to be irradiated.

The optical unit 19*d* is an optical lens and is configured such that its emission surface 19*e*, from which the laser is emitted to the object, has a rectangular shape. Moreover, each of the emitting devices 19 is configured such that the emission surface 19*e* of the optical unit 19*d* faces the fiber bundle 2 during each laying of the fiber bundle 2. Each of the emitting devices 19 is provided in such a direction that the direction of the long side of the emission surface 19*e* having the rectangular shape matches the front-rear direction.

Infrared lasers have high directivity. Further, the optical unit 19*d* is configured such that the irradiation range for the object (the fiber bundle 2 during each laying thereof) is the same as that of the emission surface 19*e*. Since each of the emitting devices 19 is provided between the pressing roller 18 and the guide roller 17 in the front-rear direction as described above, an irradiation range L in the front-rear direction (hereinafter, referred to as a "front-rear direction irradiation range L") by each of the emitting devices 19 (the emission surface 19*e* of the optical unit 19*d*) is also the part between the pressing roller 18 and the guide roller 17.

Further, although the irradiation devices 19 are arranged abreast in the width direction as described above, the size of each of the emitting devices 19 in the width direction is slightly smaller than the width of the corresponding one of the fiber bundles 2. Moreover, in the present embodiment, an irradiation range B in the width direction (hereinafter, referred to as a "width direction irradiation range B") by each of the emitting devices 19 (the optical unit 19*d*) is about 30% of the width of the corresponding one of the fiber bundles 2.

Further, the emitting device 19 is connected to the main control device 30 described above, and the emission therefrom is controlled by the main control device 30. Therefore, the main control device 30 includes an emission control device 34 configured to cause the emitting device 19 to emit the laser (FIG. 2).

Inputs of the emission control device 34 is connected to the placement control device 32 and the storage device 31 described above. Further, outputs of the emission control device 34 is connected to the emitting devices 19. Meanwhile, the placement control device 32 is configured to output the speed signal and the stop signal to be output to the motor control device 33 as described above also to the emission control device 34. In response to the input of the speed signal, the emission control device 34 calculates duration (hereinafter, referred to as "irradiation duration") for which a point in the fiber bundle 2 is continuously irradiated along the front-rear irradiation range L with the infrared laser according to the moving speed indicated by the speed signal. Specifically, the irradiation duration is calculable by dividing the front-rear direction irradiation range L by the moving speed.

Further, the storage device 31 described above stores values related to the output of infrared laser determined on the assumption that the fiber bundle 2 is properly deposited onto the stacking surface 5*a* by irradiation over the irradiation duration according to different irradiation duration assumed. In the present embodiment, the value related to the output is the output value of infrared laser per unit area (hereinafter, referred to as an "optical density"). Specifically, the optical density is a value calculable by dividing the output of infrared laser by the area (L×B) of the irradiation range. Each optical density is input into the storage device 31 by the setting input device 29.

Moreover, the emission control device 34 is configured to select the optical density corresponding to the calculated irradiation duration from the optical densities stored in the storage device 31 as the irradiation duration is calculated as described above. Furthermore, the emission control device 34 is configured to calculate the output value of infrared laser that achieves the selected optical density. The emission control device 34 is configured to control each of the emitting devices 19 so that the emission of the infrared laser having the calculated output value is achieved.

Operation of the automated fiber bundle placement apparatus 1 of the present embodiment including the emitting device 19 described above is as follows.

The laying of the fiber bundle 2 is performed by the placement control device 32 controlling operation of each part of the polyarticular robot 7 according to the operation programs described above. At the start of one placement, first, the placement head 6 is moved to the starting position for laying the fiber bundle 2, and the pressing roller 18 of the placement head 6 presses the tip of each of the fiber bundles 2 onto the placement die 5 at the starting position. Moreover, based on the moving speed set for each laying of the fiber bundle 2 in the operation programs, the placement head 6 is moved such that the pressing roller 18 presses each of the fiber bundles 2 as described above. Further, along with the movement, the drive motor 12*b* of each of the feeding mechanisms 12 operates under the control of the motor control device 33, and each of the feeding mechanisms 12 feeds the fiber bundle 2 toward the pressing roller 18 at a transfer speed that matches the moving speed of the placement head 6. The laying of each of the fiber bundles 2 on the placement die 5 is thus carried out.

Further, at the start of movement for the laying of the fiber bundle 2, a speed signal corresponding to the moving speed of the laying is output from the placement control device 32 to the emission control device 34. In response to the speed signal input into the emission control device 34, the emission control device 34 controls each of the emitting devices 19 to start emission of the infrared laser toward the corresponding fiber bundle 2. As a result, the placement of each of the fiber bundles 2 is executed along with the emission of the infrared laser from the corresponding emitting device 19.

Meanwhile, the emission of infrared laser at the time of placing the fiber bundle 2 is performed with an output at which proper incomplete deposition of the fiber bundle 2 to the stacking surface 5*a* is achieved. Specifically, in response to the speed signal input into the emission control device 34 as described above, the emission control device 34 calculates the irradiation duration based on the front-rear direction irradiation range L and the moving speed indicated by the speed signal. Moreover, the emission control device 34 selects the optical density corresponding to the calculated irradiation duration from the optical densities stored in the storage device 31. Furthermore, the emission control device 34 calculates the output value of the infrared laser that achieves the selected optical density. The emission control device 34 controls each of the emitting devices 19 such that the infrared laser having the calculated output value is emitted. As a result, the emission of the infrared laser at the time of placing the fiber bundle 2 is performed with an output at which proper incomplete deposition of the fiber bundle 2 to the stacking surface 5*a* is achieved.

Since each of the emitting devices 19 is provided in the placement head 6 as described above, each of the emitting devices 19 emits the laser toward the corresponding one of the fiber bundles 2 laid on the stacking surface 5*a* on its surface that is the reverse side of its surface facing the stacking surface 5*a*. Therefore, according to such a configuration, part of the fiber bundle 2 that is being laid on the stacking surface 5*a* and is to be deposited to the stacking surface 5*a* is directly heated by the laser. Moreover, immediately after the part of the fiber bundle 2 is heated, it is pressed against the stacking surface 5*a* by the pressing roller 18 that is positioned behind the emitting device 19 in the moving direction of the placement head 6. As a result, each of the fiber bundles 2 is incompletely deposited to the stacking surface 5*a*.

When the placement head 6 reaches the ending position for laying the fiber bundle 2, under the control of the placement control device 32, the movement of the placement head 6 by the polyarticular robot 7 is stopped, and a stop signal is output to the motor control device 33 and the emission control device 34. As a result, each of the feeding mechanisms 12 stops feeding the fiber bundle 2 toward the pressing roller 18, and each of the emitting devices 19 stops the emission, whereby one placement of the fiber bundles 2 on the stacking surface 5*a* is completed. Thereafter, the placement head 6 is moved by the polyarticular robot 7 to a position in the upper-lower direction where the pressing roller 18 and the stacking surface 5*a* are separated, and is moved to the laying starting position for starting the next placement.

As described above, in the automated fiber bundle placement apparatus 1 based on the present invention described above, each of the emitting devices 19 is provided in the placement head 6 such that it can emit the laser toward the corresponding one of the fiber bundles 2 laid on the stacking surface 5*a* on its surface that is the reverse side of its surface facing the stacking surface 5*a*. As a result, in the automated fiber bundle placement apparatus 1, part of the fiber bundle 2 that is laid on the stacking surface 5*a* and is to be deposited to the stacking surface 5*a* is directly heated by the laser. Immediately after the part is heated, it is pressed by the pressing roller 18 and is incompletely deposited to the stacking surface 5*a*. Therefore, each of the fiber bundles 2 is deposited on the stacking surface 5*a* more reliably than in conventional automated fiber bundle placement apparatus.

By the way, in the automated fiber bundle placement apparatus 1 according to the present invention, in order to enhance the practicality of the apparatus, it is preferable that the moving speed be determined such that the calculated irradiation duration is longer than or equal to 0.1 sec.

In the incomplete deposition of the fiber bundle 2 to the stacking surface 5*a* by the automated fiber bundle placement apparatus 1, it is expected that the output of infrared laser and the irradiation duration thereof affect the state of the fiber bundle 2 and the incomplete deposition thereof. Therefore, a test (incomplete deposition test) was conducted by changing the output and irradiation duration of infrared laser in the incomplete deposition.

Meanwhile, in the test, the fiber bundle 2 impregnated with PAEK as a matrix resin was used. PAEK is a so-called super engineering plastic having a relatively high melting point among thermoplastic resins. Therefore, the fiber bundle 2 impregnated with PAEK has a high degree of difficulty in incomplete deposition when placed on the stacking surface 5*a*, due to the high melting point described above. Further, the fiber bundle 2 having a thickness of 0.2 mm was used in the test. A film made of the PAEK as the matrix resin was placed in advance on the upper surface of the placement die 5, and the upper surface of the film was used as the stacking surface 5*a*.

Further, used in the test was the emitting device 19 in which the length L in the front-rear direction of the optical unit 19*d* is 84 mm. Moreover, since the irradiation duration is calculable by dividing the front-rear direction irradiation range L by the moving speed as described above, the moving speed was changed to a plurality of speeds in order to change the irradiation duration. The output of infrared laser was changed at each of a plurality of irradiation durations, and the state of the fiber bundle 2 and the incomplete deposition thereof at each output were checked.

Specifically, with regard to the state of incomplete deposition, the output was changed at each irradiation duration, it was verified what lowest output achieves a desired incomplete deposition state. Further, with regard to the state of the fiber bundle 2, since scorching or the like occurs on the surface of the fiber bundle 2 when the output is too high, resulting in an unacceptable state as a product, it was verified what highest output achieves the surface state is in an acceptable range.

Figure 4:
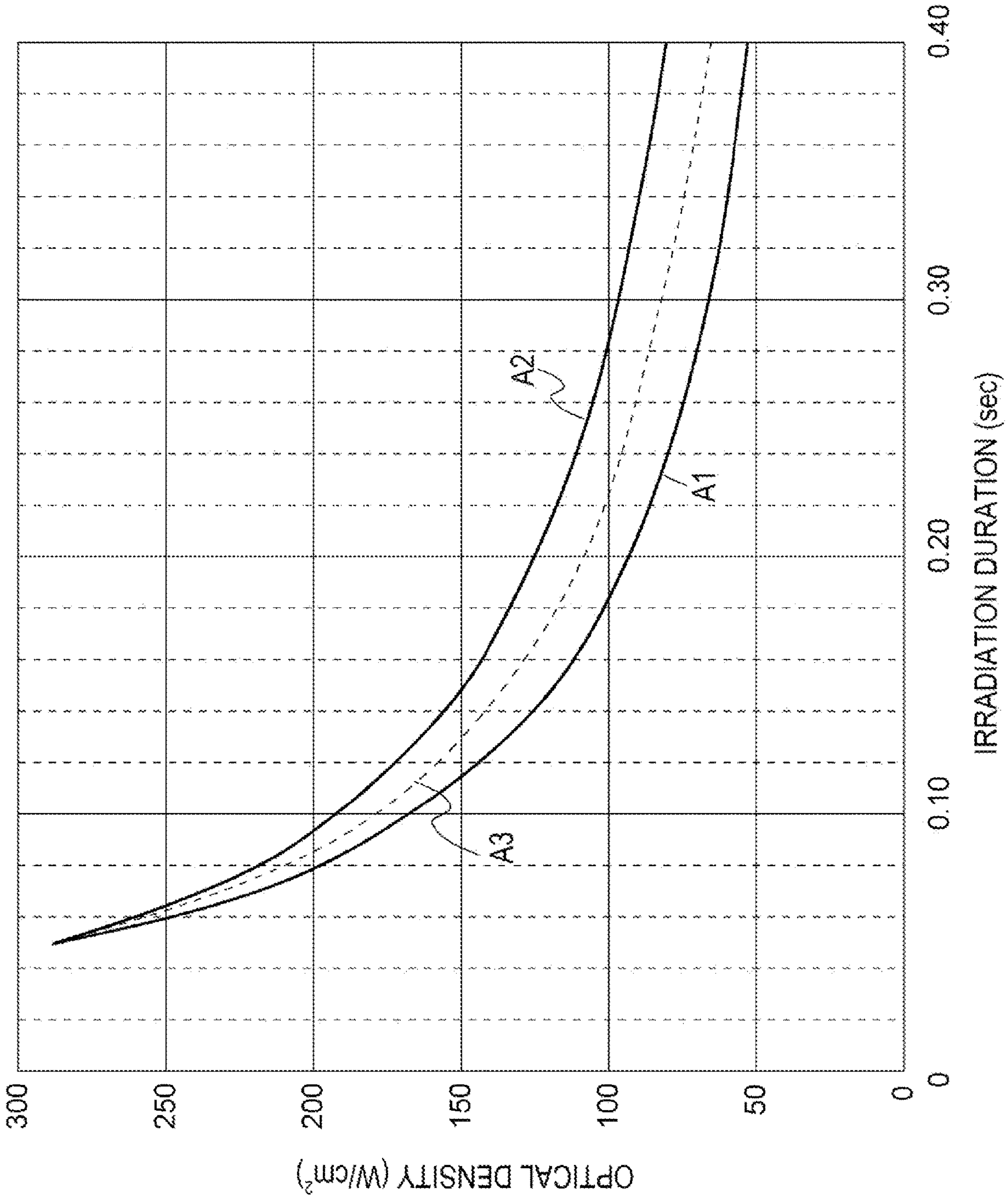
FIG. 4 is a graph showing results of an incomplete deposition test.

FIG. 4 is a graph showing the results of the test. In this graph, the horizontal axis represents the irradiation duration, and the vertical axis represents the optical density instead of the output of the infrared laser itself. As described above, the optical density is calculable by dividing the output of infrared laser by the area of the irradiation range (L×B). Meanwhile, with regard to the vertical axis as the optical density, when the area of the irradiation range in the laser irradiation device changes, the effect on the state of the incomplete deposition and the state of the fiber bundle 2 caused by irradiation of infrared laser having the same output changes. On the other hand, when the optical density calculated by dividing the output of infrared laser by the area of the irradiation range is used as a parameter, even when the area of the irradiation range changes, the relationship between the optical density and the effect on the state of the incomplete deposition and the state of the fiber bundle does not change. Therefore, in FIG. 4, the optical density was used as the parameter of the vertical axis of the graph so that the results shown in the graph can be handled in the same manner by the laser irradiation devices in which the area of the irradiation range (for example, the irradiation range in the width direction in the optical unit 19*d* of the embodiment) is different.

A1 shown in FIG. 4 denotes the lower limit values of the optical density at which a desired incomplete deposition state was obtained at each irradiation duration. Therefore, below A1, proper incomplete deposition of the fiber bundle 2 to the stacking surface 5*a* could not be achieved. Further, A2 shown in FIG. 4 denotes the upper limit values of the optical density at which an acceptable surface state of the fiber bundle 2 was obtained. Therefore, above A2, the surface state of the fiber bundle 2 was in an unacceptable state as a product (for example, a state in which scorching occurs).

Between A1 and A2 shown in FIG. 4, the surface state of the fiber bundle 2 acceptable as a product and the desired incomplete deposition state were obtained, and the incomplete deposition of the fiber bundle 2 to the stacking surface 5*a* was properly achieved. Meanwhile, as described above, the moving speed of the placement head 6 during each laying of the fiber bundle 2 is included in the preset operation programs, and the front-rear direction irradiation range L can be mechanically determined, so that the irradiation duration for each laying of the fiber bundle 2 can be calculable in advance. Therefore, for each laying of the fiber bundle 2, the value of the optical density may be set within the range between A1 and A2 shown in FIG. 4 for the irradiation duration calculable in advance.

Figure 5:
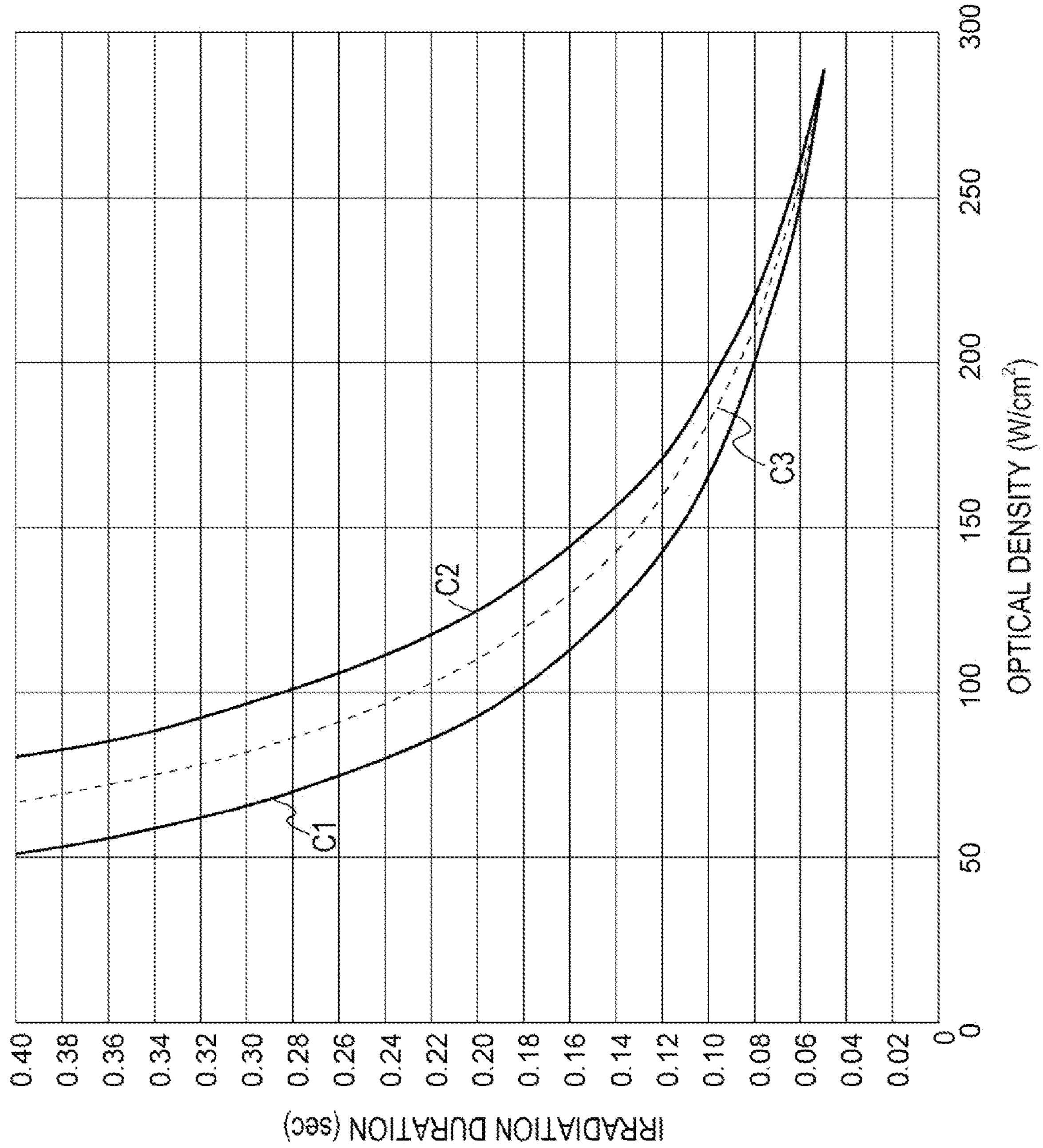
FIG. 5 is a graph in which a vertical and a horizontal axes in FIG. 4 are interchanged.

Moreover, FIG. 5 is a graph in which the vertical and the horizontal axes in FIG. 4 are interchanged. That is, in FIG. 5, the horizontal axis represents the optical density, and the vertical axis represents the irradiation duration. Further, C1 shown in FIG. 5 is a curve in which the vertical and the horizontal axes in A1 shown in FIG. 4 are interchanged, and C2 shown in FIG. 5 is a curve in which the vertical and the horizontal axes in A2 shown in FIG. 4 are interchanged. Between C1 and C2 shown in FIG. 5 is the range in which the surface state of the fiber bundle 2 were acceptable as a product, the desired incomplete deposition state was obtained, and the incomplete deposition was properly achieved.

Meanwhile, in order to enhance the working efficiency of the laying of the fiber bundle 2, it is required to increase the moving speed of each laying of the fiber bundle 2. When the moving speed is increased, the irradiation duration calculable by dividing the front-rear direction irradiation range L by the moving speed becomes shorter. Furthermore, if the irradiation duration is shortened in this way, as can be understood from FIGS. 4 and 5, it is necessary to increase the value of the optical density in order to perform the incomplete deposition within the proper range described above. As can be read from FIG. 5, if the value of the optical density is large, the width of the irradiation duration for which the incomplete deposition can be properly performed at the optical density (the output of infrared laser) becomes small.

Further, the moving speed is preferably faster as described above, and should not be slower than 15 m/min. If the moving speed is set to, for example, 42 m/min, in the automated fiber bundle placement apparatus 1 described above, the irradiation duration calculable from the moving speed and the front-rear direction irradiation range L (84 mm) is 0.12 sec. As can be read from FIG. 4, when the irradiation duration has such a value, the range of the optical density in which proper incomplete deposition can be performed is 145-173 W/cm$^2$.

Therefore, the optical density for performing the incomplete deposition at that time can be set to, for example, 159 W/cm$^2$, which is the median value of the range. In this case, the moving speed is 42 m/min (irradiation duration is 0.12 sec) and the optical density of the irradiated infrared laser is 159 W/cm$^2$. Meanwhile, the dotted line A3 shown in FIG. 4 denotes the median values of the optical densities in each range between A1 and A2.

By the way, as each part of the polyarticular robot 7 is driven, the placement head 6 is moved according to the moving speed and the moving direction included in the operation programs by the combining the motions of each part. Therefore, during each placement of the fiber bundle 2, an error may occur between the moving speed set in the operation programs and the actual moving speed. This error may increase as the set moving speed increases.

Therefore, when the set moving speed is 42 m/min as described above, the actual moving speed becomes the speed at which the error occurs within the range of ±3 m/min. Specifically, the actual moving speed changes in the range of 39-45 m/min. In this case, the irradiation duration changes between 0.11 sec and 0.13 sec. That is, the irradiation duration changes in the range off 0.01 sec (width of 0.02 sec).

In this case, when the optical density is set to 159 W/cm$^2$ as described above, as can be read from FIG. 5, the range of the irradiation duration at which proper incomplete deposition can be performed is 0.11-0.14 sec, and the width thereof is 0.03 sec. Therefore, when the set moving speed is 42 m/min, the incomplete deposition is performed at an appropriate range even when the error occurs in the actual irradiation duration as described above.

In this way, based on the front-rear direction irradiation range L that is mechanically determined, the output (optical density) of infrared laser is determined for the set moving speed (irradiation duration obtained therefrom), and it is possible to determine whether or not appropriate incomplete deposition can be performed in that case. Meanwhile, in the above case, when the set moving speed is greater than 42 m/min (the set irradiation duration is shortened), the output (optical density) of the infrared laser to be selected becomes greater, and the range of the irradiation duration (width of irradiation duration) at which incomplete deposition can be properly performed becomes narrower.

Moreover, it was found from the result of intensive research by the inventors of the present application that, based on the front-rear direction irradiation range L that is mechanically determined, when the irradiation duration obtained from the set moving speed is longer than or equal to 0.1 sec, the incomplete deposition can be more reliably achieved in an appropriate range even when an error occurs in the moving speed (irradiation duration) as described above in the output (optical density) of the infrared laser determined for the irradiation duration.

In other words, since the reliability of achieving the incomplete deposition in an appropriate range is reduced when the moving speed is set such that the irradiation duration is shorter than 0.1 sec, it becomes difficult to set the moving speed, or the automated fiber bundle placement apparatus itself has to be controlled with higher precision, whereby problems arise in terms of practicality and feasibility of the apparatus. Therefore, the moving speed is preferably determined so that the irradiation duration is longer than or equal to 0.1 sec.

Further, in the automated fiber bundle placement apparatus 1 according to the present invention, in order to meet the demand for increasing the moving speed of the placement head 6 within a more preferable range, the moving speed is preferably determined so that the irradiation duration determined from the moving speed is shorter than or equal to 0.4 sec.

In the automated fiber bundle placement apparatus, it is preferable that the moving speed set as described above is faster than or equal to 15 m/min. When the moving speed is 15 m/min, the irradiation duration is about 0.34 sec in the case of the present embodiment in which the front-rear direction irradiation range L is 84 mm.

However, in general automated fiber bundle placement apparatuses, there is also an apparatus in which the irradiation device is configured so that the maximum front-rear direction irradiation range L is about 100 mm. Meanwhile, when the moving speed is the same, the irradiation duration becomes longer as the front-rear direction irradiation range L becomes larger. Further, the irradiation duration becomes shorter as the moving speed becomes faster. Thus, assuming that the front-rear direction irradiation range L is 100 mm, which is the maximum value, and the moving speed is 15 m/min, which is the minimum value, the calculated irradiation duration is 0.4 sec. Therefore, when the moving speed is determined so that the irradiation duration is shorter than or equal to 0.4 sec, proper incomplete deposition can be realized while meeting the demand for the moving speed if the front-rear direction irradiation range L is within the general size range as described above.

Although an embodiment of the automated fiber bundle placement apparatus according to the present invention has been described above, the present invention is not limited thereto, and can be implemented in other embodiments (modifications) as follows.

(1) In the above embodiment, regarding the lower limit of the irradiation duration, when the fiber bundle 2 impregnated with PAEK as a matrix resin is used, the moving speed in the automated fiber bundle placement apparatus 1 is determined so that the irradiation duration calculated from the moving speed and the front-rear direction irradiation range L is longer than or equal to 0.1 sec. However, depending on the matrix resin in the fiber bundle, the moving speed may be determined in relation to the irradiation range in the front-rear direction so that the irradiation duration is shorter than 0.1 sec.

Specifically, when a fiber bundle impregnated with a resin (for example, PA6 resin) having a lower melting point than PAEK as a matrix resin is used, compared to the case of using the fiber bundle impregnated with PAEK, the irradiation duration at which a desired incomplete deposition state is obtained becomes shorter even with the same optical density (output of infrared laser). Therefore, in such a case, the moving speed in the automated fiber bundle placement apparatus may be determined so that the irradiation duration is shorter than 0.1 sec.

Further, in the above embodiment, regarding the upper limit of the irradiation duration, the moving speed in the automated fiber bundle placement apparatus 1 is determined so that the irradiation duration is shorter than or equal to 0.4 sec. However, the automated fiber bundle placement apparatus of the present invention is not limited thereto. For example, when the work of laying of the fiber bundle 2 does not require a very high efficiency, the set moving speed can be lower than 15 m/min. In such a case, the irradiation duration becomes longer than 0.4 sec when the irradiation range in the front-rear direction is within the general size range as described above. Thus, the automated fiber bundle placement apparatus may be set so that the irradiation duration is longer than 0.4 sec depending on the working efficient of the laying or the like.

(2) In the above embodiment, regarding the front-rear direction irradiation range L, the emitting device 19 has a configuration in which the range of the optical unit 19*d* (the emission surface 19*e*) in the front-rear direction becomes the front-rear direction irradiation range L. That is, the emitting device 19 in the above embodiment has a configuration in which the front-rear direction irradiation range L is fixed. However, the irradiation device in the present invention is not limited thereto and may be configured so that the front-rear direction irradiation range L can be changed.

Regarding the configuration in which the front-rear direction irradiation range L can be changed, specifically, the irradiation device is configured such that the optical unit is detachable and the optical unit having different length dimensions in the front-rear direction can be attached. Moreover, the optical unit to be attached may be changed to one having a different length dimension in the front-rear direction to change the front-rear direction irradiation range L.

Further, the irradiation device may be configured so that a lens is provided between the optical unit and the stacking surface 5*a*, and then, the distance between the lens and the stacking surface 5*a* is changeable, thereby changing the front-rear direction irradiation range L.

For more details, in the case where a lens for refracting infrared laser is provided between the optical unit and the stacking surface 5*a*, the infrared laser emitted from the optical unit is refracted by the lens, and therefore, the front-rear direction irradiation range L has a size corresponding to the distance between the lens and the stacking surface 5*a*. Thus, after configuring the irradiation device so that the distance can be changed, the front-rear direction irradiation range L may be changed by changing the distance. Meanwhile, as a configuration for changing the distance, the position of only the lens may be changed in the upper-lower direction, or the position of the entire irradiation device may be changed in the upper-lower direction.

Meanwhile, in the above embodiment, in realizing a desired irradiation duration, the moving speed is set to a speed corresponding to the irradiation duration. However, when the automated fiber bundle placement apparatus (irradiation device) is configured so that the front-rear direction irradiation range L can be changed as described above, a desired irradiation duration may be realized by fixing the moving speed and changing the front-rear direction irradiation range L. Alternatively, a desired irradiation duration may be realized by changing both of the moving speed and the front-rear direction irradiation range L. Thus, in the automated fiber bundle placement apparatus of the present invention, a desired irradiation duration is obtained by appropriately determining the moving speed and/or the front-rear direction irradiation range L.

Further, in the above embodiment, regarding the width direction irradiation range B, the emitting device 19 is configured so that the ratio of the width direction irradiation range B to the width of the fiber bundle to be irradiated is about 30%. However, in the present invention, the width direction irradiation range B is not limited thereto. Therefore, the irradiation device may be configured so that the ratio of the width direction irradiation range B is smaller than 30% described above, or is longer in the range up to the width of the fiber bundle.

(3) In the above embodiment, regarding the configuration of pressing the fiber bundle against the stacking surface and the configuration associated therewith, the placement head 6 includes the pressing roller 18 as a component for pressing the fiber bundle against the stacking surface 5*a*. Further, the placement head 6 includes the guide roller 17 provided on the upstream side of the path of the fiber bundle to the pressing roller and for turning the path of the fiber bundle toward the pressing roller 18. Moreover, in the above embodiment, similar to the pressing roller 18, the guide roller 17 is provided to press the fiber bundle against the stacking surface 5*a*. However, the guide roller may not be provided to press the fiber bundle against the stacking surface, but may be provided only to turn the path toward the pressing roller.

Further, the configuration for pressing the fiber bundle against the stacking surface is not limited to a rotating roller-like member such as the pressing roller of the above embodiment, but may be a so-called pressing shoe provided to be in sliding contact with the fiber bundle without rotating. Further, in the present invention, the placement head is not limited to being configured to have the guide roller for turning the path of the fiber bundle toward the member that presses the fiber bundle against the stacking surface. For example, as the configuration for pressing the fiber bundle against the stacking surface, a glass plate may be provided over a range including the front-rear direction irradiation range L in the front-rear direction, and the placement head may be configured so that the fiber bundle is pressed against the stacking surface by the glass plate. Moreover, the irradiation by the irradiation device may be performed to be directed toward the fiber bundle through the glass plate. Meanwhile, in the case of this configuration, the fiber bundle is turned to be oriented in a direction parallel to the stacking surface at one end in the front-rear direction of the glass plate as a member for pressing.

(4) The above embodiment is an example in which the present invention is applied to an automated fiber bundle placement apparatus configured to simultaneously lay eight fiber bundles. However, the automated fiber bundle placement apparatus to which the present invention is applied is not limited thereto, but may be configured to simultaneously lay the fiber bundles more than eight or the fiber bundle less than eight. Further, the apparatus to which the automated fiber bundle placement apparatus according to the present invention is not limited to one configured to lay a plurality of fiber bundles at the same time, but may be configured to lay one fiber bundle. Furthermore, the automated fiber bundle placement apparatus to which the present invention is applied is not limited to an AFP apparatus that places a relatively narrow fiber bundle on a stacking surface, and for example, may be an ATL apparatus that places a relatively wide tape-like fiber bundle on a stacking surface.

Further, the present invention is not limited to any of the embodiment described above, and can be modified as appropriate without departing from the gist thereof.

The automated fiber bundle placement apparatus may further include a pressing roller configured to press the fiber bundle against the stacking surface, and a guide roller that is provided upstream from the pressing roller in a path of the fiber bundle and is configured to turn the path of the fiber bundle toward the pressing roller, and the emitting device may be configured to emit the laser to part of the fiber bundle between the pressing roller and the guide roller.

A moving speed of the placement head and/or an irradiation range of the laser in a direction in which the placement head moves may be determined such that irradiation duration, which is dependent on the moving speed and the irradiation range, is within the range of 0.1-0.4 sec.

The "irradiation duration" mentioned above refers to duration dependent on the moving speed of the placement head and the irradiation range of the laser in the direction in which the placement head moves as described above. Specifically, the "irradiation duration" is a value (duration) calculatable by dividing the irradiation range of the laser in the direction in which the placement head moves by the moving speed of the placement head, where the irradiation duration is a time for which a point in the fiber bundle is continuously irradiated along the longitudinal direction of the fiber bundle with the laser from the emitting device.

According to the present invention, in the automated fiber bundle placement apparatus configured to emit a laser from an emitting device to deposit a fiber bundle on a stacking surface incompletely as described above, the emitting device is configured to emit the laser toward the fiber bundle laid on the stacking surface to its surface that is a reverse side of its surface facing the stacking surface. In this configuration, part of the fiber bundle laid on the stacking surface is irradiated with the laser from the emitting device, which is configured to heat (deposit) the fiber bundle. Further, the part, which is to be deposited on the stacking surface, is directly heated by the laser and is, shortly thereafter, deposited onto the stacking surface. As a result, according to the present invention, the fiber bundle can be deposited on the stacking surface more reliably than in conventional automated fiber bundle placement apparatus.

If the moving speed of the placement head and/or the irradiation range of the laser in the direction in which the placement head moves is determined such that the irradiation duration, which is dependent on the moving speed and the irradiation range, is shorter than or equal to 0.4 sec, the demand for increasing the moving speed of the placement head described above can be realized preferably. Specifically, in automated fiber bundle placement apparatus, the irradiation range of laser in the longitudinal direction of the fiber bundle is about 100 mm at maximum generally, and the moving speed of the placement head when placing the fiber bundle is faster than or equal to 15 m/min preferably in terms of efficiency of the work. Therefore, if the irradiation range is within the general range as described above and the moving speed and/or the irradiation range is determined such that the irradiation duration is shorter than or equal to 0.4 sec, the demand for increasing the moving speed to 15 m/min or more is satisfied.

Moreover, if the moving speed and/or the irradiation range is determined such that the irradiation duration is longer than or equal to 0.1 sec, sufficient time for heat conduction and a range in which the fiber bundle is properly deposited to the stacking surface are ensured. As a result, proper deposition of the fiber bundle in the automated fiber bundle placement apparatus can be easily realized, which enhances the practicality of the automated fiber bundle placement apparatus.

The invention claimed is:

1. An automated fiber bundle placement apparatus configured to perform placement of a strip-shape fiber bundle impregnated with a thermoplastic resin, the apparatus comprising:

a placement head configured to move for performing the placement;

an emitting device provided in the placement head; and a main control device, including:

a placement control device configured to control movement of the placement head such that movement of the placement head for the placement is performed based on a preset moving speed; and an irradiation control device configured to control irradiation of the emitting device such that the emitting device emits a laser from a start time to an end time of one placement, wherein the main control device is configured to carry out the following steps lay the fiber bundle on a stacking surface on an upper side of a placement die by moving the placement head and temporarily welding the laid fiber bundles to the stacking surface by emitting the laser from the emitting device to the fiber bundle, emit the laser toward the fiber bundle laid on the stacking surface to its surface that is a reverse side of its surface facing the stacking surface, and control a moving speed of the placement head and/or an irradiation range of the laser in a direction in which the movement of the placement head is determined such that irradiation duration, for which the laser is continuously irradiated to the same location in a longitudinal direction of the fiber bundle and which is obtained by dividing the irradiation range of the emitting device itself by the moving speed, is within the range of 0.1-0.4 sec, and wherein the emitting device is configured to emit the laser toward the fiber bundle laid on the stacking surface to its surface that is the reverse side of its surface facing the stacking surface.

2. The automated fiber bundle placement apparatus according to claim 1, further comprising:

a pressing roller configured to press the fiber bundle against the stacking surface; and a guide roller that is provided upstream from the pressing roller in a path of the fiber bundle and is configured to turn the path of the fiber bundle toward the pressing roller, wherein the emitting device is configured to emit the laser to part of the fiber bundle between the pressing roller and the guide roller.

* * * * *